(12) United States Patent
Agarwal et al.

(10) Patent No.: US 6,839,332 B1
(45) Date of Patent: Jan. 4, 2005

(54) METHOD FOR TRANSMISSION OF CIRCUITS, PACKETS, AND CELLS IN A SATELLITE/WIRELESS TDMA SYSTEM

(75) Inventors: Anil K. Agarwal, Gaithersburg, MD (US); Udayan N Borkar, Germantown, MD (US)

(73) Assignee: Comsat Corporation, Bethesda, MD (US)

( * ) Notice: Subject to any disclaimer, the term of this patent is extended or adjusted under 35 U.S.C. 154(b) by 0 days.

(21) Appl. No.: 09/529,774

(22) PCT Filed: Oct. 20, 1998

(86) PCT No.: PCT/US98/22080
§ 371 (c)(1),
(2), (4) Date: Jun. 23, 2000

(87) PCT Pub. No.: WO99/21296
PCT Pub. Date: Apr. 29, 1999

Related U.S. Application Data

(60) Provisional application No. 60/062,496, filed on Oct. 20, 1997, provisional application No. 60/064,673, filed on Oct. 20, 1997, and provisional application No. 60/062,497, filed on Oct. 20, 1997.

(51) Int. Cl.[7] .............................. G06F 11/00; H04J 3/24; H04L 12/28
(52) U.S. Cl. ..................... 370/321; 370/349; 370/465; 370/395.4; 370/324
(58) Field of Search ................................. 370/321–322, 370/324, 329, 348, 349, 389, 392, 336, 337, 465, 467, 474, 395.1, 395.4, 395.43, 395.5, 395.6, 535, 539

(56) References Cited

U.S. PATENT DOCUMENTS

| | | | | | |
|---|---|---|---|---|---|
| 5,065,398 | A | * | 11/1991 | Takashima | 370/230 |
| 5,537,414 | A | * | 7/1996 | Takiyasu et al. | 370/347 |
| 5,710,756 | A | * | 1/1998 | Pasternak et al. | 370/216 |
| 5,729,536 | A | * | 3/1998 | Doshi et al. | 370/398 |
| 5,757,784 | A | * | 5/1998 | Liebowitz et al. | 370/321 |
| 5,768,264 | A | * | 6/1998 | Anderson et al. | 370/280 |
| 6,295,023 | B1 | * | 9/2001 | Bloebaum | 342/357.06 |

* cited by examiner

*Primary Examiner*—Afsar Qureshi
(74) *Attorney, Agent, or Firm*—Sughrue Mion, PLLC

(57) ABSTRACT

According to an exemplary embodiment an architecture for a new integrated TDMA system capable of carrying circuit data (e.g., voice, vides, ISDN), packet data (e.g., X.25, Frame Relay, Internet, LAN), and ATM cells is disclosed. The architecture may be used for satellite and wireless TDMA networks, for example. For this transmission formats for bursts (101), channels (130, 140), TDMA frames (10) are defined and an adaptation layer for the three traffic types is described. In addition, the network has to carry its own management traffic and provide timing and control information to all terminals. For this the invention defines special bursts and along with their associated properties and formats. Each burst contains a data section which is divided into a number of channels. Each of the channels is adapted to carry protocol data units (141, 142, 143) which enable the system to efficiently allocate data according to its individual format or protocol thereby enabling maximum use of available bandwidth under prevailing communication conditions.

11 Claims, 5 Drawing Sheets

PDU FORMAT FOR PACKET-CELL DATA CHANNELS

SAR SEGMENT FORMAT FOR PACKETS (SAR-1)

PDU FORMAT FOR CIRCUIT DATA CHANNELS

SAR SEGMENT FORMAT FOR CELLS (SAR-0)

METHOD FOR TRANSMISSION OF CIRCUITS, PACKETS, AND CELLS IN A SATELLITE/WIRELESS TDMA SYSTEM

CROSS REFERENCE TO RELATED APPLICATIONS

This application is based on and claims priority from U.S. Provisional Patent Application Ser. Nos. 60/062,496, 60/064,673, and 60/062,497 filed Oct. 20, 1997, which are incorporated herein by reference in their entirety for all purposes.

BACKGROUND

The present invention relates generally to satellite communication systems and in particular to a new architecture for a Time Division Multiple Access (TDMA) system for carrying circuit data, packet data, and Asynchronous Transfer Mode (ATM) cells in a common framework.

Satellite TDMA systems have greatly evolved over the years. Earlier satellite TDMA systems were primarily designed to carry voice/speech signals. As the size and number of data applications grew, satellite TDMA systems were then used to interconnect corporate Local Area Networks (LANs). Now with the advent of the INTERNET, satellite TDMA systems are being used to interconnect gateways between networks spanning the entire globe. Along with the evolution of satellite systems, the transmission characteristics of terrestrial, wireless, and satellite environments have also changed due to advances in optic fiber, new coding and signal processing techniques, in addition to faster and cheaper hardware. These combined changes have in turn lead to a change in nature of networking protocols. For example, for data communications, protocols have evolved from the X.25, to Frame Relay, to ATM protocols.

As a result of the change in the nature of traffic carried by satellite TDMA systems, the satellite TDMA systems must now be capable of meeting the specific individual requirements of the types of traffic being carried by the satellite systems. This is particularly true with the ATM communication protocol in which different classes of service (e.g., Constant Bit Rate (CBR), Real Time Variable Bit Rate (RTVBR), Non Real Time Variable Bit Rate (NRT-VBR), Unspecified Bit Rate (JBR), Available Bit Rate (ABR) all require a different quality of service commitment from any network carrying these different types of ATM data. For example, it may be desirable to deliver a voice data packet even if the packet contains a few bit errors because the overall message content is not severely degraded and is still capable of being understood. On the other hand, if there are any errors in the header of a data packet, the data packet cannot be correctly delivered.

Furthermore, data traffic is inherently bursty in nature. In other words, the time between transmissions, the length of a transmission, and the amount of data in the transmission, can vary greatly. As a result, newer communication systems require the capability of providing bandwidth-on-demand. Therefore, TDMA systems should now be more flexible and be able to adapt to the different traffic characteristics of various communication protocols.

Directly contrasting modern communications' need for bandwidth on demand is the fact that satellite systems are bandwidth limited. Due to the bandwidth constraints of satellite communications, it is important to limit the use of coding to only those times when it is needed. For example, additional coding is justified when a communication link experiences fading or when the particular service type requires it. Conventionally, most satellite systems are designed to provide the performance required under worst case conditions. As a result, conventional satellite systems waste bandwidth under normal operating conditions when the additional coding is not required.

There are several TDMA systems currently used in satellite communications systems. The most common system is the INTELSAT TDMA system. In addition, several other systems have based their design on the INTELSAT system. The INTELSAT system was designed primarily to carry voice traffic communications. Some VSAT systems carry Internet data traffic. However, currently there are no systems which can carry ATM, packet data, and voice traffic in an integrated fashion. This in turn results in wasted bandwidth from these systems and inefficient use of satellite resources.

SUMMARY

It is therefore an object of the invention to provide an improved satellite/wireless communications system capable of efficient use of available bandwidth under varying conditions.

It is another object of the invention to provide the different classes of data with different quality of service commitments for use in an integrated TDMA system for wireless satellite communications.

According to an exemplary embodiment of the present invention the foregoing and other objects are accomplished through implementation of an architecture for a new integrated TDMA system capable of carrying circuit data (e.g., voice, video, ISDN), packet data (e.g., X.25, Frame Relay, Internet, LAN), and ATM cells. The concepts described here are applicable to satellite, wireless TDMA networks.

For this transmission formats for bursts, channels, TDMA frames are defined and an adaptation layer for the three traffic types is described. In addition, the network has to carry its own management traffic and provide timing and control information to all terminals. For this the invention defines special bursts and along with their associated properties and formats.

According to the present invention a uniform structure for bursts and procedures to carry cells, circuits, and packets is provided. In addition, the same structure is also reused for Network Control Traffic. As a result, the system according to the various embodiments of the invention offers flexibility in allocating bursts for user traffic and network control. At the same time, the separation of user data and network control channels makes the system according to the present invention more robust than current conventional communications systems.

According to the exemplary embodiments provided, control bursts may be shared (used for small stations) or dedicated (used for large gateways). In addition, packets and cells are allowed to share a common set of bursts. Furthermore, independently selectable parameters are provided for each burst (e.g., Coding, Modulation, Length, Simple procedures for burst, sub-burst management). According to the present invention, an adaptation layer is defined for carrying all three types of traffic (circuits, packets, and cells). A simple packet segmentation and reassembly protocol is also provided. The present invention also supports inverse multiplexing, and multi-hop routing previously unavailable with conventional systems.

According to the various embodiments of the invention, the combination of inner and outer coding leads to higher performance. Bursts can be provided Point-to-Point, Pointto-Multipoint, Multipoint-to-Point, Multipoint-to-Multipoint. In addition, unicast and multicast traffic is supported and multiple terminals are allowed to share a burst when necessary.

The present invention provides for different quality of service commitments for the different types of traffic. In addition, the communications system of the present invention can adjust to changing weather conditions (e.g., rain fade), and support terminals positioned at beam edges.

The present invention also supports bandwidth-on demand operation, meshconnectivity, multi-carrier operation, transponder hopping (for satellite systems). In addition, adaptive coding according to the various embodiments of the invention leads to better utilization of the available bandwidth, a precious resource in satellite systems, under normal operating conditions, bandwidth that was wasted in conventional systems.

BRIEF DESCRIPTION OF THE DRAWINGS

The foregoing and other features, objects, and advantages of the invention will be better understood by reading the following description in conjunction with the drawings, in which.

DETAILED DESCRIPTION

Figure 1:
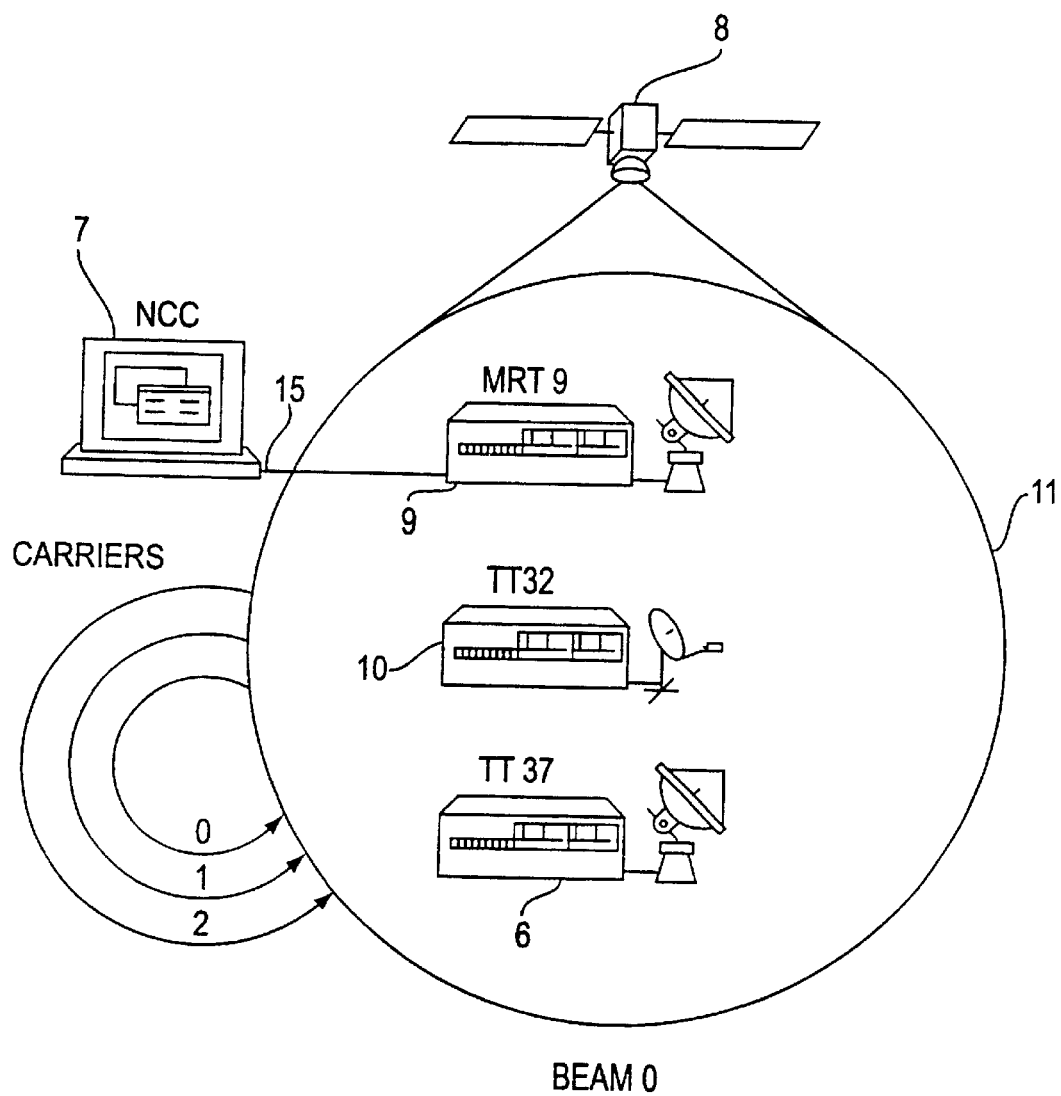
FIG. 1 shows an exemplary system configuration in a global beam mode according to an embodiment of the invention.

The various features of the invention will now be described with respect to the figures, in which like parts are identified with the same reference characters.

System Configuration and Structure

According to one exemplary embodiment of the invention, the various embodiments are described in conjunction with use of fixed or bandwidth-on-demand TDMA systems. According to this exemplary embodiment, a network consists of a Network Control Center and associated terminals. A number of the associated terminals act as a source of timing for all other terminals. These timing terminals are referred to herein as reference terminals. For the purpose of the further embodiments discussed below, all other terminals are referred to as traffic terminals for simplicity.

Figure 2:
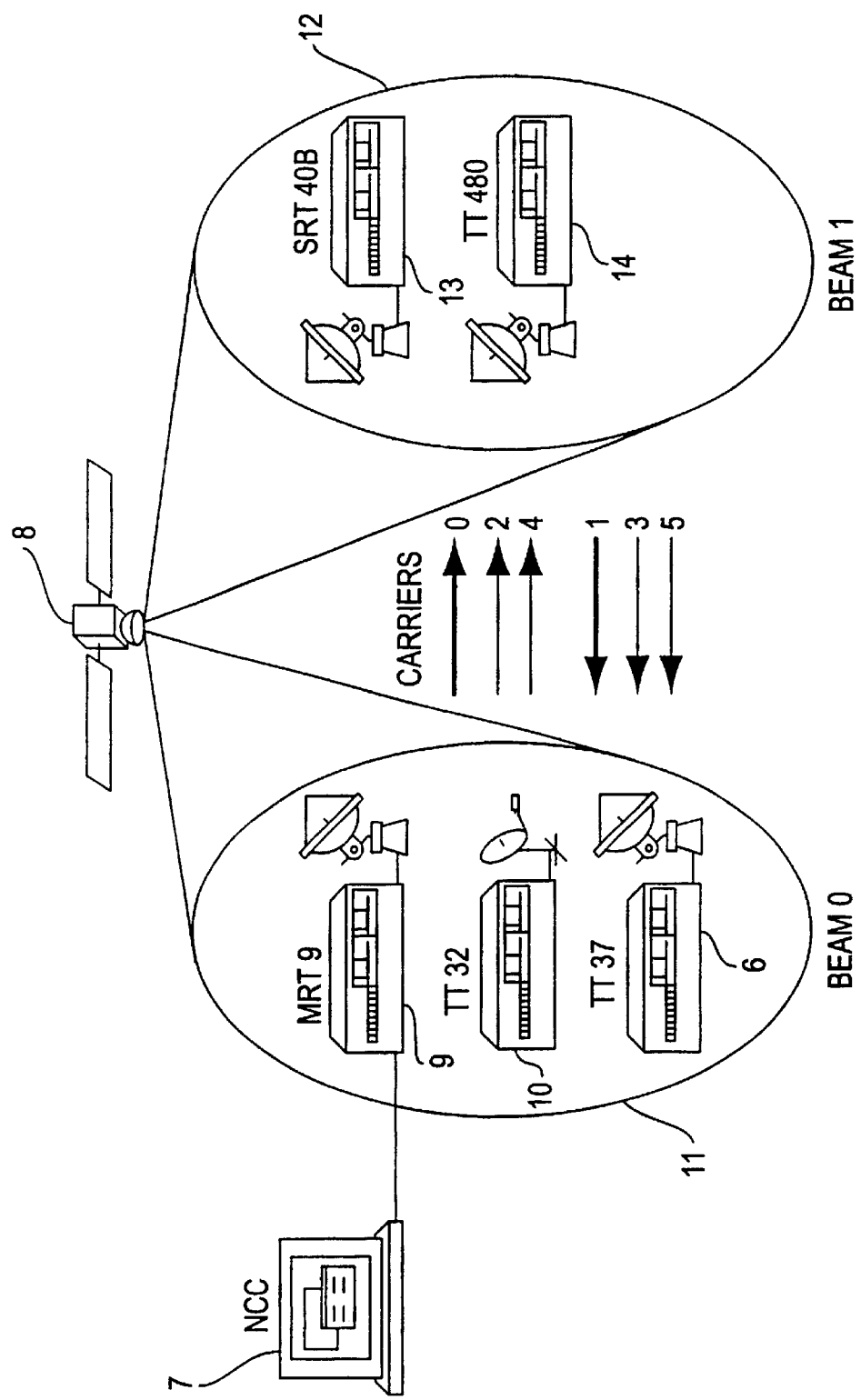
FIGS. 2 show an exemplary system configuration in a spot beam mode according to an embodiment of the invention.

Turning to the exemplary embodiments shown in FIGS. 1 and 2, a TDMA network architecture is illustrated. The network consists of a Network Control Center (NCC) 7 and TDMA terminals. The NCC 7 performs overall management and control of the network and does not carry user traffic. Terminals are connected to user telecommunications equipment and communicate with one another using wireless transmissions via the satellite. Some of the terminals in the network act as a source of timing for all other terminals. These are called reference terminals. All other terminals are called traffic terminals for example, terminals 6, 10, and 14.

The Master Reference Terminal (MRT) 9 acts as the primary source of timing for the entire network. For redundancy purposes, there may be an alternate master (AMRT) (not shown), which assumes the role of the MRT 9 if the MRT 9 fails. For networks which work in a spot-beam mode, as shown in FIG. 2, where the MRT 9 does not receive its own transmissions, a secondary reference terminal (SRT) 13 may be used. In this case the SRT 13 acts as a source of timing for all terminals in the same beam as the MRT 9 and the MRT 9 acts as a source of timing for all other terminals. There may also be an alternate secondary reference terminal (ASRT) (not shown) which assumes the role of the SRT 13 if the SRT 13 fails. The NCC is connected to the MRT 9 and the AMRT through a LAN interface 15.

The terminals are grouped into logical groups defined as control groups. According to an exemplary embodiment of the invention, a control group is substantially a multicast group. The present invention is applicable to satellite systems, such as a bent-pipe satellite system, and to wireless TDMA systems. The system further described in detail below is mesh connected. However, a skilled artisan will appreciate that the same concepts can be applied to other topologies (e.g., a star topology, spoke-and-hub, etc.). A primary role of the Network Control Center is to coordinate the actions of the different terminals. One skilled in the art will further appreciate that the concepts described herein do not mandate a Network Control Center. For example, the various embodiments can be adapted to function in a distributed environment as well, as long as, the actions of the different terminals are coordinated.

The TDMA Frame and Burst Structure

According to an exemplary embodiment of the invention, time is divided using a framing structure. In this embodiment, a frame is defined as a fixed period of time, and is provided with a means to identify the start and end of that fixed time period. All terminals in the system are synchronized to this frame structure. The start of transmit frame is defined as the SOTF instant, and the start of receive frame is defined as the SORF instant. N consecutive frames form a multiframe. C consecutive frames form a control frame. The size of the control frame, or C, is selected based on the drift in time caused by satellite motion. In order to prevent drifting in time during communication, that will cause the terminal to lose its synchronization, a message is sent to the NCC and back to the terminal in order to make the necessary correction in timing. According to a preferred embodiment of the invention, C is picked such that the traffic terminal has not drifted in time more than 5 microseconds. However, one skilled in the art will appreciate that this time will depend on the type of network and satellites used and therefore may be adjusted accordingly.

Figure 3:
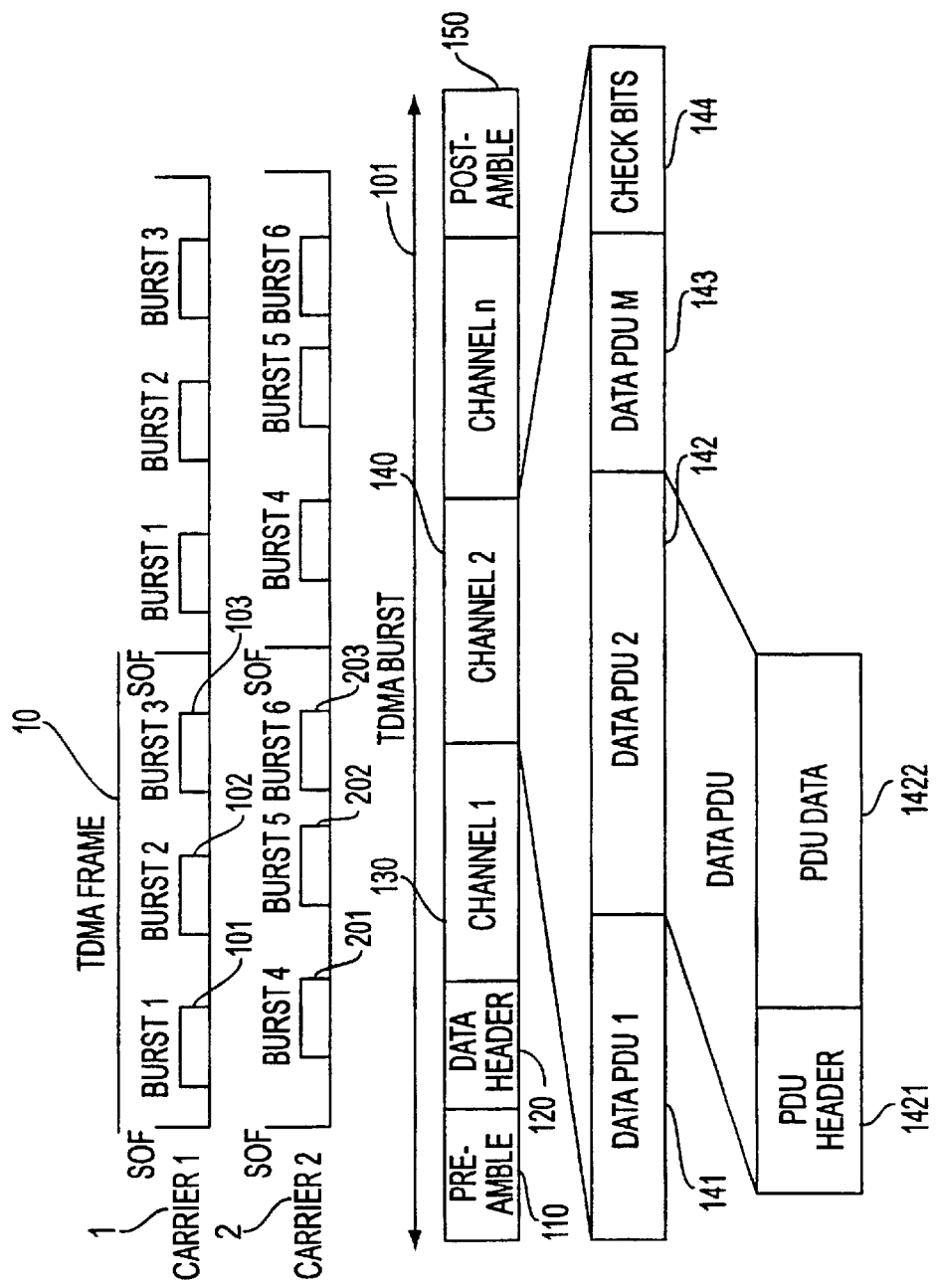
FIG. 3 shows an exemplary TDMA Frame, Carriers, Bursts, and Channels according to an embodiment of the invention.

Turning to the exemplary embodiment shown in FIG. 3, a carrier 1 contains a number of TDMA frames 10. The frame 10 contains variable sized bursts (e.g., 101, 102, 103, etc.) separated by a guard time to allow for possible uncertainty in burst positions. A burst 101 consists of a preamble 110, followed by a data portion (e.g., data header, channels 1–n), and a postamble 150.

The preamble 110 in turn comprises a Carrier Bit Timing Recovery (CBTR) part and a Unique Word (UW) part. These are used by a terminal in order to lock to incoming bursts by detection of the UW. The data portion consists of several channels (1–n). The channels can carry various data. The data portion of the burst is typically coded using some "inner" coding for error correction. For example, Viterbi @ rate ½, ⅔, ¾, ⅞ etc, may be used as for convolutional error detection and correction. A rate ¾ means for every 3 bits of information transmitted, 1 coding bit is added. In addition, data may be scrambled for energy dispersal.

As pointed out, a burst consists of several channels (e.g., 130, 140, etc.).

Channels may be formed of various different types, such as Packet-Cell and Circuit, for example. Packet-Cell channels can carry both variable length packets and cells. Circuit channels can carry circuit data, for example, Integrated Services Digital Network (ISDN). The channels contain information plus "outer" coding, for example, Reed-Solomon, 0–N bytes. Coding can be assigned on a per burst and a per channel basis based on the type of traffic being carried. It is possible on reception of a channel to detect whether all errors detected in the channel can be corrected. If all errors in a packet-cell channel cannot be corrected, all data in that channel may be discarded.

A burst, according to an exemplary embodiment of the invention is defined by the following set of information:

Burst Id: Each burst in the system has a unique identifier

Burst Offset: Position of the burst relative to the start of frame instant

Burst type: One of RB/ SB/ TB/ AB/ QB (described in detail below)

Coding: FEC rate

Modulation: BPSK, QPSK etc.

Aperture Type: Normal, Search, AB

Carrier Id: Which carrier the burst is on

Transponder Id: Which transponder to use

Source: Originating Terminal(s)

Destination: Destination Terminal(s)

Multiframemask: Which frame(s) of a multiframe this burst is transmitted in.

Number of channels for each channel:
    Channel Type: Packet-Cell/Circuit
        Data Size in bytes
        Number of Check Bytes Bursts can be classified according to following classes based on their source and destination addresses:

Point-to-Point: Both the source and destination are single terminals

Point-to-Multipoint: The source is a single terminal and the destination is a control group Multipoint-to-Point: The source is a control group and the destination is a single terminal Multipoint-to-Multipoint: Both the source and destination are control groups The NCC decides which types of bursts to allocate based on monitored system conditions.

Point-to-Multipoint bursts can carry both unicast and multicast traffic. Unicast cells/packets transmitted on a Point-to-Multipoint burst are received by all terminals receiving the burst and are accepted only if the cell/packet is addressed to a terminal. Multicast packets are received and accepted by all terminals receiving the burst. The Multipoint-to-Point and Multipoint-to-Multipoint bursts are aloha bursts. An aloha burst is a shared burst that any terminal sharing the can transmit on that time slot. Since multiple terminals can transmit these bursts, if two or more terminals transmit a burst in the same frame they may collide and the data will be lost. If the data is lost the terminals will retransmit the data later by sending the data at different times.

Bursts are classified into five types. The first type of burst is a Reference Bursts (RB). RBs are transmitted only by reference terminals but are received by all traffic terminals. RBs act as the source of timing for the whole network. Control information from the network control center or reference stations is also sent through use of these bursts. The Data Header section of the reference burst contains a frame ID which is used to synchronize the system.

Signaling bursts (SB) carry Network Management traffic from traffic terminals to the reference terminals and the network control center, for example, configuration messages, monitoring and control messages, and acquisition and synchronization messages. SBs may also be used for additional capacity from the reference terminals to traffic terminals. In order to support various protocols it may be necessary to set up signaling bursts directly between traffic terminals.

Traffic bursts (TB) are used to carry user traffic and go directly between traffic terminals or control groups. Acquisition bursts (AB) are used to acquire a traffic terminal, in other words, establish the traffic terminal's timing relative to that of the rest of the network. ABs are transmitted by traffic terminals and received by reference terminals.

Control bursts (QB) are used to maintain the timing of a terminal once it has been acquired and its timing established. QBs are also transmitted by traffic terminals and received by reference terminals. In all bursts, other than the reference bursts, the data header (120) section is empty.

A network may contain several carriers, such as carriers 1 and 2, shown in FIG. 3. Each carrier operates at a different frequency. A burst (e.g., 101, 102, 103) is allocated on a carrier. The bursts 101, 102, and 103 on the same carrier do not overlap in time; however, bursts on different carriers may however overlap in time. For example, as shown in FIG. 1 burst 101 on carrier 1 overlaps in time burst 201 on carrier 2. Bursts transmitted (or received) by a terminal also may not overlap in time.

A network burst time plan is provided which includes information about all current bursts, channels, and carriers in the system. The burst time plan changes as a result of traffic changes in real time through monitoring of system conditions by the NCC. As traffic needs change from terminal to terminal with the passage of time the NCC can monitor these changes and through the various control messages adjust the distribution of the bursts that are allocated between the units based on the burst time plan. A subset of the burst time plan is sent to the appropriate terminals on an as needed basis. Only those terminals which are affected by changes in the burst time plan are sent updated burst plan changes by the NCC using RBs. The network control center bandwidth manager allocates and assigns bursts to the terminals based on the terminal's traffic requirements.

All terminals in the network are synchronized so that the start of transmit frame instants coincide at the satellite. This is accomplished through use of an acquisition and synchronization procedure. According to this embodiment, every terminal has a transmit burst time plan which defines all the bursts currently being transmitted by the terminal. Similarly, each terminal also has a receive burst time plan which includes all the bursts being received by the terminal. According to this embodiment bursts may be added or deleted at any time. This feature is typical of bandwidth-on-demand systems where bandwidth is increased or decreased as required. Furthermore, there is no requirement for the creation of time slots in which the bursts must be contained. Bursts can be of variable length.

The terminals insert data into the appropriate channels based on the packet and burst destinations, the type of the channel, etc. Priorities and priority queues may be used to select which packets' cells should be inserted in which channels. Control traffic is sent as packets on control bursts (AB, QE, SB, RB). As a result, no additional hardware support is required to handle control traffic.

The TDMA Adaptation Layer (TAL)

The following section describes an exemplary method for transmission for cells, packets, and circuits in channels in bursts according to an embodiment of the invention.

As shown in FIG. 3, a channel contains several Protocol Data Units (PDUs). Each PDU 142 has a header 1421 and a data section 1422. Turning to the exemplary embodiments shown in FIG. 2 the PDU formats for circuit data, cells, and packets are illustrated. As shown in FIG. 2A, for circuit data, the channel contains exactly one PDU 142A which contains all information to be transmitted for this circuit in this TDMA channel. As shown in FIGS. 2B for cells and packets a channel may contain multiple PDUs. For cells, each PDU contains one cell. For packets, a packet is segmented into multiple fixed size PDUs. A PDU may contain data or it may be idle.

Figure 4B:
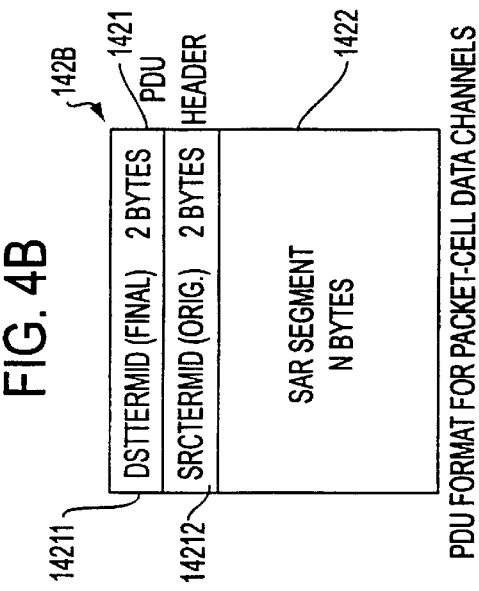
FIGS. 4A–D show an exemplary format for circuit data, cells, and packets according to the invention.
Figure 4D:
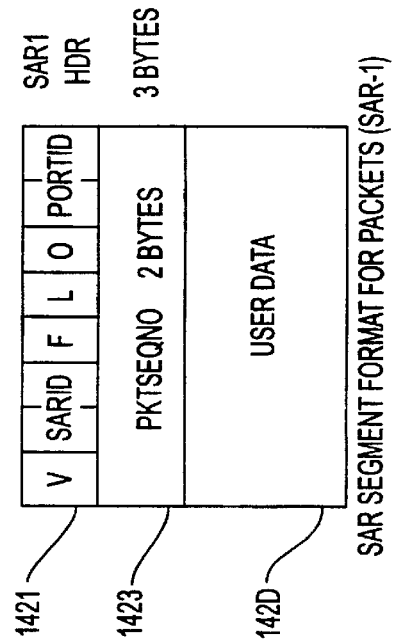
Figure 4A:
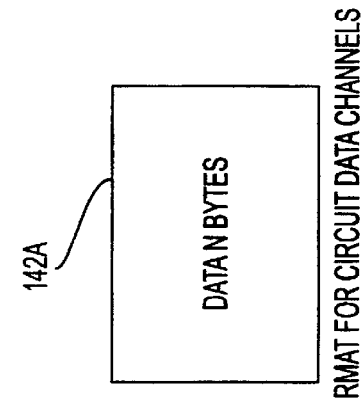

As shown in FIG. 4A, according to this embodiment, circuit data PDUs do not require a header. Since there is a fixed amount of data to be transmitted in every TDMA frame, one can use a fixed association of channels and circuits. In addition, data for a single circuit may span multiple channels.

As shown in FIG. 4B, for packets and cells, the PDU header 1421 contains the addresses of the source 14211 and the destination terminals 14212. The headers includes the addresses from the original source and the final destination in case the packet goes through multiple hops. The terminal address consists of two parts. The first part includes the control group to which the terminal belongs and the second part includes the number of the terminal within the control group.

Figure 4C:
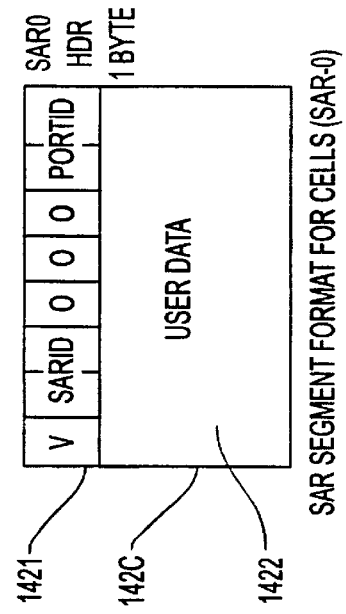

The PDU Data section contains a Segmentation and Reassembly (SAR) header. The SAR contains a valid bit that indicates whether the PDU is an idle PDU or a PDU that carries data. The SAR header is different for cells and packets and is distinguished using the SAR ID field as shown if FIGS. 4C and 4D. According to one preferred embodiment a 0 is used for cells and 1 for packets. The port ID field is used to distinguish between various protocols using the SAR function. The SAR-1 PDU format which is used by packets contains a First (F) bit which is set in the first PDU for the packet and a last (L) bit which is set in the last PDU for the packet. It also contains an unsigned sequence number which is assigned by the source terminal. Successive PDUs are assigned consecutive sequence numbers. According to a preferred embodiment the sequence number should be large enough so that it does not wrap around (in other words go back to zero) at the peak terminal data rate for a long time, for example, according to a preferred embodiment. The receiving terminal uses the sequence number to reassemble the packets.

Figure 5:
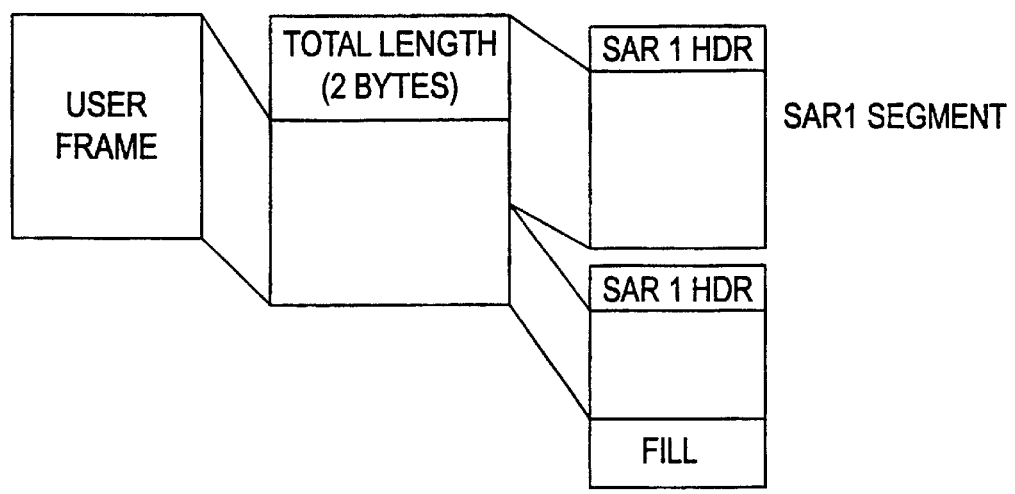
FIG. 5 shows an exemplary packet segmentation according to the invention.

FIG. 5 shows an exemplary division of a user frame into individual SAR segments. The SAR segment size is fixed for all SAR IDs. For packets the length is first prepended to the data and the resulting packet is then segmented into fixed size PDUs.

This invention describes a new architecture for a TDMA system for carrying circuit data (e.g. voice, video, ISDN), packet data (e.g. X.25, Frame Relay, Internet, LAN), and ATM cells in a common framework. The concepts described here are applicable to satellite, wireless TDMA networks. The salient features of this invention are According to the present invention a uniform structure for bursts and procedures to carry cells, circuits, and packets is provided. In addition, the same structure is also reused for Network Control Traffic. As a result, the system according to the various embodiments of the invention offers flexibility in allocating bursts for user traffic and network control. At the same time, the separation of user data and network control channels makes the system according to the present invention more robust the current convention communications systems.

According to the exemplary embodiments provided, control bursts may be shared (used for small stations) or dedicated (used for large gateways). In addition, packets and cells are allowed to share a common set of bursts. Furthermore, independently selectable parameters are provided for each burst, sub-burst, for example, Coding, Modulation, Length, Simple procedures for burst, sub-burst management. According to the present invention, an adaptation layer is defined for carrying all three types of traffic (circuits, packets, and cells). A simple packet segmentation and reassembly protocol is also provided. The present invention also supports inverse multiplexing, and multi-hop routing previously unavailable with conventional systems.

According to the various embodiments of the invention, the combination of inner and outer coding leads to higher performance. Bursts can be provided Point-to-Point, Point-to-Multipoint, Multipoint-to-Point, Multipoint-to-Multipoint. In addition, unicast and multicast traffic is supported and multiple terminals are allowed to share a burst when necessary.

The present invention provides for different quality of service commitments for the different types of traffic. In addition, the communications system of the present invention can adjust to changing weather conditions (e.g., rain fade), and support terminals positioned at beam edges.

The present invention also supports bandwidth-on demand operation, meshconnectivity, multi-carrier operation, transponder hopping (for satellite systems). In addition, adaptive coding according to the various embodiments of the invention leads to better utilization of the available bandwidth, a precious resource in satellite systems, under normal operating conditions, bandwidth that was wasted in conventional systems.

The present invention has been described by way of example, and modifications and variations of the exemplary embodiments will suggest themselves to skilled artisans in this field without departing from the spirit of the invention. The preferred embodiments are merely illustrative and should not be considered restrictive in any way. The scope of the invention is to be measured by the appended claims, rather than the preceding description, and all variations and equivalents which fall within the range of the claims are intended to be embraced therein.

What is claimed is:

1. An assembly of signals for a transmission architecture in a time division multiple access (TDMA) system for satellite or wireless communication comprising:

at least one carrier;

a plurality of frames, said frames being transmitted on said carriers;

one or more bursts contained within said frames including a preamble portion;

a data portion including one or more channels; and a postamble portion, wherein each of said one or more channels are divided into one or more protocol data units and a number of check bits, said protocol data units being adapted to transmit circuit data, cell data, and packet data.

2. The assembly of claim 1, wherein said frames have a fixed length.

3. The assembly of claim 1, wherein said protocol data units are formatted to contain circuit data and each of said one or more channels only one protocol data unit.

4. The assembly of claim 1, wherein said protocol data units are formatted to contain cell data and each of said one or more protocol data units contains one cell.

5. The assembly of claim 1, wherein said protocol data units are formatted to contain packets and each of said packets is segmented into multiple fixed sized protocol data units.

6. The assembly of claim 4, wherein said protocol data units include a header section and a data section, said protocol data unit header including the source of the transmission and the destination of the transmission.

7. The assembly of claim 5, wherein said protocol data units include a header section and a data section, said protocol data unit header including the source of the transmission and the destination of the transmission.

8. The assembly of claim 6, wherein said protocol data unit data section includes a segmentation and reassembly header.

9. The assembly of claim 7, wherein said protocol data unit data section includes a segmentation and reassembly header.

10. The assembly of claim 1, wherein the same architecture is used for both data traffic and network control traffic on said carriers.

11. The assembly of claim 1, wherein parameters from the group of coding, modulation, length are independently selectable for each burst.

* * * * *